United States Patent Office 3,772,236
Patented Nov. 13, 1973

3,772,236
POLYFLUOROCARBON-MOISTURE CURING POLY-URETHANE POLYVINYL BUTYRAL-DISPERSION COMPOSITION FOR LOW FRICTION COATINGS
Cornelius Soons, Scheemda, Netherlands, assignor to Acheson Industries, Inc., Port Huron, Mich.
No Drawing. Continuation-in-part of application Ser. No. 872,765, Oct. 30, 1969, which is a continuation-in-part of application Ser. No. 645,612, June 13, 1967, both now abandoned. This application Nov. 9, 1971, Ser. No. 197,101.
Int. Cl. C08f 45/24
U.S. Cl. 260—29.6 F
11 Claims

ABSTRACT OF THE DISCLOSURE

Stabilized dispersions of polytetrafluoroethylene particles in a water-containing moisture curing polyurethane polymer solution suitable for use in preparing low-friction protective coatings, methods of preparing such dispersions and methods of applying these dispersions to substrates to form low-friction coatings.

CROSS REFERENCE TO RELATED APPLICATION

This application is a continuation-in-part of copending U.S. application Ser. No. 872,765, filed Oct. 30, 1969, now abandoned, which latter application is in turn a continuation-in-part of copending U.S. application, Ser. No. 645,612, filed June 13, 1967, now abandoned, entitled "Polytetrafluoroethylene-Moisture Curing Polyurethane Polyvinyl Butyral-Dispersion Composition For Low Friction Coatings."

BACKGROUND OF THE INVENTION

For many years the ability of polytetrafluoroethylene resin to form low-friction objects and shapes has been known and utilized. More recently, formation of similar low-friction and protective surface coatings on various substrates has also been desired. The earliest attempts to form such coatings resulted in procedures which required the application of polytetrafluoroethylene particles to the substrate and fusion of the applied particles at high temperatures, in the order of 680–750° F. Such high fusion temperatures severely limit the wide use of such coating methods. In order to avoid such high fusion temperatures several inventors have proposed the use of resin-bonded polytetrafluoroethylene particles, with the resin as a matrix, to form the coatings. Typical of such coatings are those of U.S. Pat. 3,293,203 (the disclosure of which is incorporated herein by reference) and Dawe et al. U.S. Pat. 2,976,257, where various thermosetting resins in combination with various stabilizers and resin modifiers are used to form coating compositions which may be cured at temperatures below those needed to sinter polytetrafluoroethylene to form coatings. The polyurethane described in Table 1, Example 4 of the Dawe et al. patent is a drying oil modified with isocyanate and not a moisture curing polyurethane composition as in the instant patent application.

Moreover, the Dawe et al. dispersions due to problems in the area of stability were unsuitable for use as a one package dispersion composition having a shelf life of several months.

Other polytetrafluoroethylene-resinous binder coating compositions have been developed in which no external heating is required to form adherent coatings. Such coatings as in U.S. Pats. 3,154,506 and 3,055,852, which utilize cellulosic resins to form adherent low-friction coatings, are limited in their protective properties by the inherent properties of the resinous binders. Accordingly, it is an object of this invention to provide an improved dispersion composition containing high molecular weight polytetrafluoroethylene particles and thermosetting resin material with the dispersion composition being particularly stable; the method of preparing this composition; and, the method of applying this composition to substrates to form low-friction coatings.

Other objects, features and advantages of the present invention will become apparent from the subsequent description and the appended claims.

SUMMARY OF THE INVENTION

I have now found that by the use of a specific moisture curing polyurethane resin, together with polyvinyl butyral resin, in combination with polytetrafluoroethylene particles, having a molecular weight greater than 500,000, a stable dispersion with long storage life can be obtained, which more nearly duplicates the protective properties of pure fused polytetrafluoroethylene without the fusion temperature limitations. Heretofore those skilled in the art have been unable to attain a dispersion composition having the advantages of this invention, and which composition includes a moisture curing polyurethane resin.

Also, in order to overcome the above deficiencies, I have now discovered a method of forming an adherent, protective, and low-friction coating of polytetrafluoroethylene particles firmly bonded to a substrate by a polyurethane resin, such coating being formed from a heretofore unobtainable, highly stable, water-containing dispersion including said polyurethane resin and polytetrafluoroethylene particles.

DESCRIPTION OF THE PREFERRED EMBODIMENTS

The desired dispersion may be obtained by preparing a composition of polytetrafluoroethylene particles in a solution of modified polyurethane polymer in a water-containing medium.

The amount of polyurethane resinous component present, relative to the polytetrafluoroethylene is in sufficient quantity to act as the continuous phase and binder holding the polytetrafluoroethylene particles to the substrate surface.

It has surprisingly and completely unexpectedly been found that this modified polyurethane resin component is effective when formulated with the polytetrafluoroethylene in the presence of substantial amounts of water. Normally a moisture curing polyurethane resin of the type hereinafter described would not be considered usable by one skilled in the art in a composition containing water.

The polyurethane resinous component useful in this invention is a combination of (1) a high molecular weight, moisture curing, reaction product of polyester and polyisocyanate, i.e., polyurethane polymer, and (2) a polyvinyl butyral resin dissolved in an organic solvent or in solvent blends. This combination of resinous material is unusual and produces unexpected action in that, contrary to all previously known information, substantial amounts of water can be added to this combination, for example, as an aqueous polytetrafluoroethylene dispersion, without adversely affecting the useful storage life, curing action, or bonding properties of the urethane polymer.

The coating compositions of this invention contain both water and organic solvents, and this carrier medium does not react with the polyurethane component to produce an abnormally short storage life; in fact, coating compositions of this invention have been stored for periods of several months, and found to remain satisfactory for use. The exact reason for such an unexpected result is unknown, but it is speculated that this may be the result of some interaction between the urethane polymer and the vinyl resin modifier.

The polytetrafluoroethylene particles useful in this invention are those which have been condensed or pluralized to such an extent that they are normally solid and are dispersible in a liquid medium of water or an organic suspending agent such as hydrocarbons, alcohols, esters, ketones, etc., and have a particle size of about 0.1 to about 3 microns, and have a molecular weight in the range of about 500,000 to about 10 million. Typical of the polymers are those produced by procedures described in the U.S. Pats. 2,534,058 and 2,478,229.

It is preferred to employ an aqueous suspension of colloidal polytetrafluoroethylene as the source of the polytetrafluoroethylene particles. An especially suitable starting material for this invention is the aqueous suspension containing 60% polytetrafluoroethylene particles having a size in the range of about 0.1 to about 3 microns, available under the trade name "Teflon 30."

The polyurethane component useful in this invention is unique. Although it is normally a moisture curing material, when used following the teachings of this invention, the presence of the water in the aqueous polytetrafluoroethylene suspension does not prematurely cure the resinous component. Urethane polymers useful in this invention are the urethane surface coating materials supplied by Dyestuffs Division of Imperial Chemical Industries Limited under the trade names "Daltosec 1150" and "Daltosec 1250." These maetrials are described as follows:

"Daltosec 1150.—A 50% by weight solution, in a mixture of n-butyl acetate and 'Pentoxone'[1], of a moisture curing polyester-polyisocyanate reaction product having a viscosity of 2.5 poise at 25° C., isocyanate value 2.5% and volatile organic isocyanate content below 0.5%.

"Daltosec 1250.—A 50% solution, in a mixture of n-butyl-acetate and 'Pentoxone,' of a moisture curing polyesterpolyisocyanate reaction product having a viscosity of 7.5 poise at 25° C., isocyanate value 4.5% and volatile organic isocyanate content below 0.5%."

A moisture curing reaction product of polyester and polyisocyanate usable in this invention is further defined and delimited as being comprised of a solution in a solvent inert to isocyanates of an isocyanate-ended polyurethane of average molecular weight more than 1000, which is soluble in said solvent and which is obtained by reaction of a polyhydroxy compound of molecular weight more than 400 and a polyisocyanate in amount sufficient to provide at least 1.05 isocyanate groups for each hydroxyl group present, and polymerized organic diisocyanate having isocyanurate rings, in which the proportions of polyurethane to polymerized diisocyanate by weight lie between the limits of 1:12 and 12:1. A useful polyurethane for the invention may also be further characterized as a reaction product of an aromatic diisocyanate with a polyesterification product of an aliphatic dicarboxylic acid and at least one aliphatic diol and the polymerized organic diisocyanate is a polymerized monocyclic aromatic diisocyanate. See U.S. Pat. 3,454,533 which discloses other types of moisture curing polyurethane resins which are usable in this invention.

The particular solvents, n-butyl acetate and "Pentoxone," used with the polyurethane resin are not critical and could be substituted for by other solvents; however, from a preferred standpoint and ease of usage said particular solvents would be present.

The fluid or liquid carrier media for the dispersions of this invention are combinations of water and organic liquids having suitable solvency. The relative proportion of water to organic liquid is not critical. The water may be introduced as such, or by using an aqueous dispersion of polytetrafluoromethylene particles. The organic solvents used are those present in the urethane polymer solution and such additional organic solvents as may be added during the compounding operations to control drying rates, solvency, etc. The preferred organic solvents are blended mixtures of methyl ethyl ketone, n-butyl acetate and 4-methoxy-4-methyl-pentanone-2.

Formulation of stable dispersions requires the presence of the polymeric stablilizer, polyvinyl butyral, such as "Butvar B–76," a product of the Monsanto Co.

The relative proportions of the various ingredients is an important factor in the successfull operation of this invention. The total non-volatile solids content of the dispersion composition should not be over about 25% by weight and the preferred maximum is about 14%. As is obvious to those skilled in the coating art, the lower limit of total solids content is not critical and may be varied by additions of organic solvents to suit the method of application. For some applications, such as dispensing from internally pressurized containers (aerosol bomb type), the total solids content may be below 1%, and broadly as low as about 0.1%.

The polytetrafluoroethylene solids may comprise about 20% to about 70% of the total solids, the preferred range being from about 35% to about 50% by weight.

The polyvinyl butyral may comprise about 10% to about 40% by weight of the total solids, the preferred range being from about 25% to about 35%.

The polyurethane polymer or resin constitutes at least 10% of the total solids, and more specifically about 10% to 70%.

Regarding the method of mixing the various ingredients, it has been found that conventional mixers such as propeller stirrers, and the like, are satisfactory provided a uniformly mixed dispersion is obtained. A suitable method of mixing is to blend the polyurethane resin solution with any desired diluting solvents, followed by the addition, with blending, of the resin modifier and finally adding the polytetrafluoroethylene component.

The products of this invention may be applied to various substrates by brushing, atomizing, spraying, dipping and the like. One particularly useful method is to apply the coating from internally pressurized spray containers, commonly called "aerosols" or "aerosol bombs." The coatings of this invention are best applied in relatively thin layers. For most purposes a coating thickness of about 0.1 to about 1.5 mils is satisfactory. Multiple coatings may be used, with solvent removal between coatings, to obtain thicker layers.

After the desired coating thickness is obtained, the coating is finally cured. This curing may be done at room temperature or accelerated by heating the coated articles. At normal room temperatures, periods of time of 6 to 24 hours are required for coatings to cure. This time can be substantially shortened by heating, at temperatures of 80–120° C. Additional drying time may be required to develop the maximum hardness of these coatings.

In order to further illustrate the invention, the following examples are provided. It is to be understood, however, that the examples are included for illustrative purposes and are not intended to be limiting of the scope of the invention as set forth in the subjoined claims.

Example I

A dispersion was prepared by mixing with a propeller mixer 12.8 parts of the polyurethane solution, Daltosec 1250, with 18.2 parts of Pentoxone and 143.6 parts of methyl ethyl ketone. 7.2 parts of polyvinyl butyral (Butvar B–76) was dissolved in this mixture. 16.7 parts of an aqueous dispersion containing 60% polytetrafluoroethylene (Teflon 30) was added to the solution and mixed till uniform. This composition was then sprayed on degreased steel panels using a De Vilbiss spray gun, Model MBC with a No. 30 tip and an air pressure between 25 and 50 pounds per square inch.

---

[1] Pentoxone is the Shell Chemical Co. trade name for the ketoether: 4 methoxy-4-methyl-pentanone-2.

These coated panels were air dried for 24 hours, and the following properties were observed on examination:

| | |
|---|---|
| Thickness | 0.6 mil. |
| Coefficient of friction | 0.07. |
| Flex test (bending around a ¼ inch mandrel) | Passed. |
| Impact test (28 in. lubs.) | Do. |
| Appearance | Hard, smooth, glossy film. |

Example II

A dispersion was prepared as in Example I using the following materials:

| | Parts by weight |
|---|---|
| Daltosec 1250 | 25.6 |
| Pentoxone | 36.4 |
| Methyl ethyl ketone | 132.2 |
| Butvar B-76 | 14.4 |
| Teflon 30 | 33.4 |
| | 242.0 |

This dispersion was then diluted 1 part to 1 part with additional methyl ethyl ketone to spraying consistency and applied to steel panels as in Example I. The coated panels, after air curing for 24 hours, had a coefficient of friction of 0.087 and had a smooth, hard, semi-gloss appearance.

Example III

A dispersion was prepared as in Example I using the following materials:

| | Parts by weight |
|---|---|
| Daltosec 1250 | 12.8 |
| Pentoxone | 18.2 |
| Methyl ethyl ketone | 143.6 |
| Butvar B-76 | 7.2 |
| Teflon 30 | 66.6 |

This dispersion was then diluted 3 parts to 1 part of methyl ethyl ketone and applied to steel panels as in Example I. The coated panels after air curing 24 hours were examined and found to have a hard, smooth surface, slightly dull in appearance and a coefficient of friction of 0.087.

Example IV

A 30-gram portion of the dispersion of Example I was inserted into a 6-ounce aerosol container preloaded with a proprietary blend of fluorinated hydrocarbon propellant and enamel solvent known under the trade name of "Enamel Type Omnipak" of the Sprayon Products Co. The dispersion was then sprayed from this container onto degreased steel panels. After curing for about 72 hours at room temperature, the coated panels were examined and found to have a smooth, hard, glossy and adherent coating with a low coefficient of friction.

Example V

The following materials were combined as in Example I to produce a coating composition:

| | Parts by weight |
|---|---|
| Daltosec 1150 | 12.7 |
| Pentoxone | 18.2 |
| Methyl ethyl ketone | 143.6 |
| Butvar B-76 | 7.3 |
| Teflon 30 | 16.7 |

This dispersion was then applied to steel panels and to rubber strips, and cured to form smooth, tough, adherent, low-friction coatings.

By the term moisture curing it is meant a urethane component or reaction product containing excess isocyanate groups which dries by reaction with moisture in the air.

It is also workable herein in this invention to use fluorocarbon polymer particles besides polytetrafluoroethylene particles such as for example other fluorinated ethylene polymer particles may be used or there may be used fluorocarbon polymer particles selected from the group consisting of fluorinated and fluoro-chlorinated polymers of $C_2$-$C_4$ olefins.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A stable, one package, dispersion composition consisting essentially of:
   (a) fluorocarbon polymer particles selected from the group consisting of fluorinated and fluoro-chlorinated polymers of $C_2$-$C_4$ olefins said particles being in aqueous suspension, and said particles being present in an amount of about 20% to about 70% by weight total solids,
   (b) a polyurethane resin component dissolved in a solvent material, said component consisting essentially of
      (1) at least one moisture curing polyester-polyisocyanate reaction product having a viscosity of about 2½ poise to about 7½ poise at 25° C., an isocyanate value of about 2½% to about 4½, and a volatile organic isocyanate content below about ½%, said reaction product being comprised of an isocyanate-ended polyurethane of average molecular weight more than 1000, which is soluble in said solvent and which is obtained by reaction of a polyhydroxy compound of molecular weight more than 400 and a polyisocyanate in amount sufficient to provide at least 1.05 isocyanate groups for each hydroxyl group present and polymerized organic diisocyanate having isocyanurate rings, in which the proportions of polyurethane to polymerized diisocyanate by weight lie between the limits of 1.12 and 12:1, and wherein the polyurethane is a reaction product of an aromatic diisocyanate with a polyesterification product of an aliphatic dicarboxylic acid and at least one aliphatic diol and the polymerized organic diisocyanate is a polymerized monocyclic aromatic diisocyanate, said reaction product being present in an amount of about 10% to about 70% by weight of total solids, and
      (2) polyvinyl butyral resin present in an amount of about 10% to about 40% by weight of total solids, and
   (c) an inert fluid carrier material, said composition having a total solids content of (a), (b), and (c) solvent free basis, of less than about 25% by weight of the composition.

2. The composition of claim 1 further characterized in that said particles are present in an amount of about 35% to about 50% by weight of total solids, said resin component is present in an amount of about 10% to about 40% by weight of total solids, and said polyvinyl butyral is present in an amount of about 25% to about 35% by weight of total solids.

3. The composition of claim 1 wherein said resin component is in solution in a solvent mixture of n-butyl acetate and 4-methoxy-4-methyl-pentanone-2.

4. The composition of claim 1 wherein the total solids content is from about 0.1% to about 25% by weight.

5. The composition of claim 4 wherein said polyurethane resin component is further characterized as being a 50% by weight solution, in a mixture of n-butyl acetate and 4-methoxy-4-methyl-pentanone-2, of a moisture curing polyester-polyisocyanate reaction product having a viscosity of 2.5 poise at 25° C. and an isocyanate value of 2.5% and a volatile organic isocyanate content below 0.5%.

6. The composition of claim 4 wherein said polyurethane resin component is further characterized as being a 50% solution, in a mixture of n-butyl acetate and 4-methoxy-4-methyl-pentanone-2, of a moisture curing polyester-polyisocyanate reaction product having a viscosity of 7.5 poise at 25° C. and an isocyanate value of 4.5% and a volatile organic isocyanate content below 0.5%.

7. A stable, one package, dispersion composition consisting essentially of:
(a) fluorocarbon polymer particles selected from the group consisting of fluorinated and fluoro-chlorinated polymers of $C_2$–$C_4$ olefins said particles being in aqueous suspension, and said particles being present in an amount of about 20% to about 70% by weight of total solids,
(b) a polyurethane resin component dissolved in a solvent material, said component consisting essentially of
(1) at least one moisture curing polyester-polyisocyanate reaction product, said reaction product being comprised of an isocyanate-ended polyurethane of average molecular weight more than 1000, which is soluble in said solvent and which is obtained by reaction of a polyhydroxy compound of molecular weight more than 400 and a polyisocyanate in amount sufficient to provide at least 1.05 isocyanate groups for each hydroxy group present, and polymerized organic diisocyanate having isocyanurate rings, in which the proportions of polyurethane to polymerized diisocyanate by weight lie between the limits of 1:12 and 12:1, said reaction product being present in an amount of about 10% to about 70% by weight of total solids, and
(2) polyvinyl butyral resin present in an amount of about 10% to about 40% by weight of total solids, and
(c) an inert fluid carrier material, said composition having a total solids content of (a), (b), and (c) solvent free basis, of less than about 25% by weight of the composition, wherein said polyurethane resin component is further characterized as being a 50% by weight solution, in a mixture of n-butyl acetate and 4-methoxy-4-methyl-pentanone-2, of a moisture curing polyesterpolyisocyanate reaction product having a viscosity of 2.5 poise at 25° C. and an isocyanate value of 2.5% and a volatile organic isocyanate content below 0.5%.

8. A stable, one package, dispersion composition consisting essentially of
(a) fluorocarbon polymer particles selected from the group consisting of fluorinated and fluoro-chlorinated polymers of $C_2$–$C_4$ olefins, said particles being in aqueous suspension, and said particles being present in an amount of about 20% to about 70% by weight of total solids,
(b) a polyurethane resin component dissolved in a solvent material, said component consisting essentially of
(1) at least one moisture curing polyester-polyisocyanate reaction product, said reaction product being comprised of an isocyanate-ended polyurethane of average molecular weight more than 1000, which is soluble in said solvent and which is obtained by reaction of a polyhydroxy compound of molecular weight more than 400 and a polyisocyanate in amount sufficient to provide at least 1.05 isocyanate groups for each hydroxyl group present, and polymerized organic diisocyanate having isocyanurate rings, in which the proportions of polyurethane to polymerized diisocyanate by weight lie between the limits of 1:12 and 12:1, said reaction product being present in an amount of about 10% to about 70% by weight of total solids, and
(2) polyvinyl butyral resin present in an amount of about 10% to about 40% by weight of total solids, and
(c) an inert fluid carrier material, said composition having a total solids content of (a), (b), and (c) solvent free basis, of less than about 25% by weight of the composition, wherein said polyurethane resin component is further characterized as being a 50% solution in a mixture of n-butyl acetate and 4-methoxy - 4 - methylpentanone-2, of a moisture curing polyester-polyisocyanate reaction product having a viscosity of 7.5 poise at 25° C. and an isocyanate value of 4.5% and a volatile organic isocyanate content below 0.5%.

9. A stable, one package, dispersion composition consisting essentially of:
(a) fluorocarbon polymer particles selected from the group consisting of fluorinated and fluoro-chlorinated polymers of $C_2$–$C_4$ olefins, said particles being in aqueous suspension, and said particles being present in an amount of about 20% to about 70% by weight of total solids,
(b) a polyurethane resin component dissolved in a solvent material, said component consisting essentially of
(1) at least one moisture curing polyester-polyisocyanate reaction product having a viscosity of about 2½ poise to about 7½ poise at 25° C., an isocyanate value of about 2½% to about 4½%, and a volatile organic isocyanate content below about ½%, said reaction product being comprised of an isocyanate-ended polyurethane of average molecular weight more than 1000, which is soluble in said solvent and which is obtained by reaction of a polyhydroxy compound of molecular weight more than 400 and a polyisocyanate in amount sufficient to provide at least 1.05 isocyanate groups for each hydroxyl group present, and polymerized organic diisocyanate having isocyanurate rings, in which the proportions of polyurethane to polymerized diisocyanate by weight lie between the limits of 1:12 and 12:1, said reaction product being present in an amount of about 10% to about 70% by weight of total solids, and
(2) polyvinyl butyral resin present in an amount less than about 40% by weight of total solids, and
(c) an inert fluid carrier material, said composition having a total solids content of (a), (b), and (c) solvent free basis, of less than about 25% by weight of the composition.

10. The composition of claim 1 wherein said particles are polytetrafluoroethylene particles.

11. The composition of claim 9 wherein said particles are polytetrafluoroethylene particles.

References Cited
UNITED STATES PATENTS 2,976,257   3/1961   Dawe et al.   260—29.6 F
3,454,533   7/1969   Derrigan et al.   260—75 NR HAROLD D. ANDERSON, Primary Examiner U.S. Cl. X.R.

117—132 CF, 161 KP, 161 UZ; 260—29.6 NR, 29.6 RB, 859 R

UNITED STATES PATENT OFFICE
CERTIFICATE OF CORRECTION

Patent No. 3,772,236                    Dated November 13, 1973

Inventor(s)    Cornelius Soons

It is certified that error appears in the above-identified patent and that said Letters Patent are hereby corrected as shown below:

Column 3, line 29, change "maetrials" to --materials--.

Column 6, line 20, before "total" insert --of--.

Column 6, line 28, after "4-1/2" insert --%--.

Column 6, line 41, change "1.12" to --1:12--.

Signed and sealed this 16th day of April 1974.

(SEAL)
Attest:

EDWARD M. FLETCHER, JR.                C. MARSHALL DANN
Attesting Officer                      Commissioner of Patents